Patented Dec. 26, 1922.

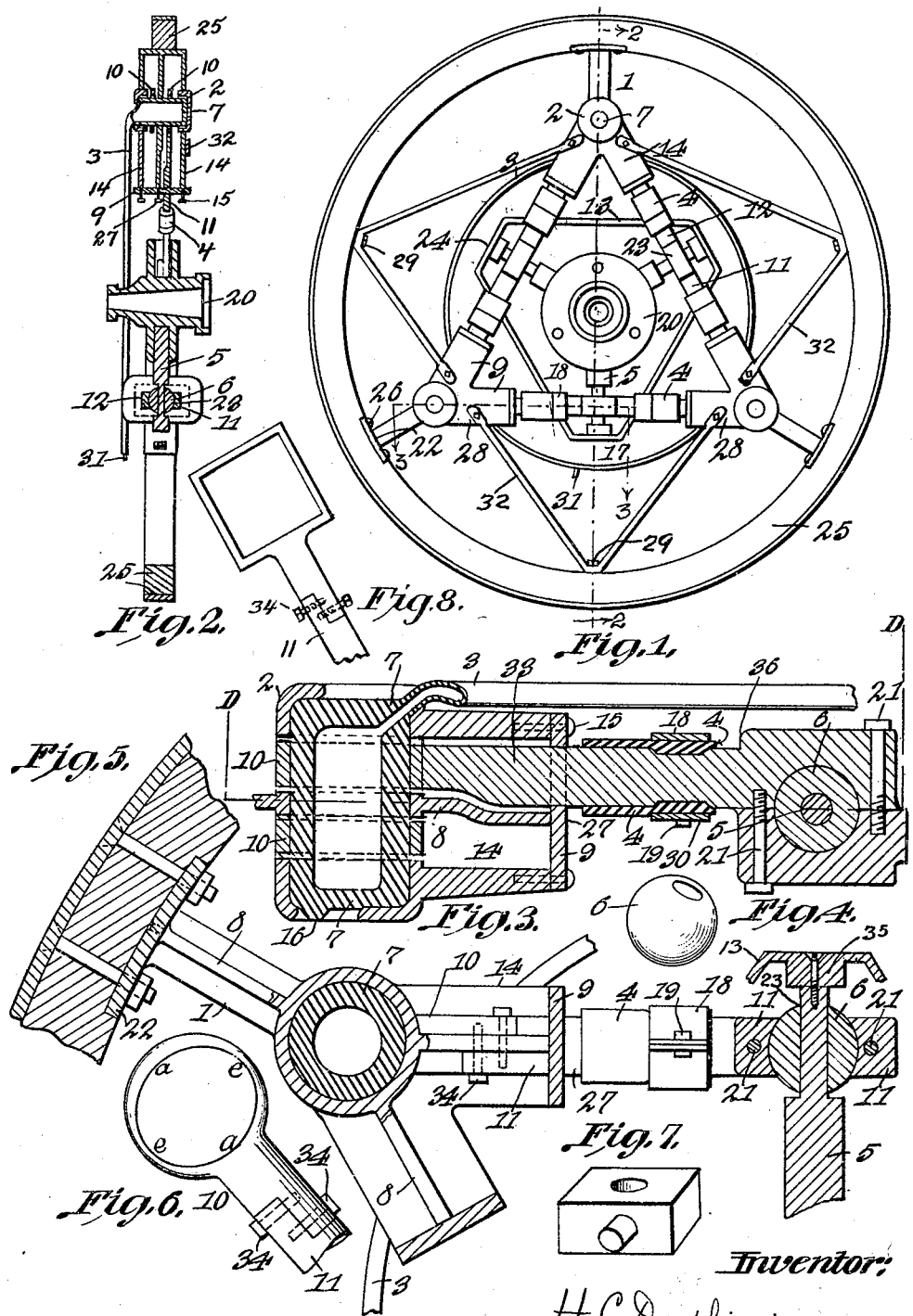

1,439,799

UNITED STATES PATENT OFFICE.

HENRY C. DAUPHINAIS, OF FARGO, NORTH DAKOTA.

VEHICLE WHEEL.

Application filed November 7, 1916, Serial No. 130,022. Renewed June 29, 1922. Serial No. 571,795.

*To all whom it may concern:*

Be it known that I, HENRY C. DAUPHINAIS, a citizen of the United States, residing at Fargo, in the county of Cass and State of North Dakota, have invented new and useful Improvements in Vehicle Wheels, of which the following is a full, clear, and exact description.

The invention relates to vehicle wheels, or the like, where a jar absorbing wheel is desired and its object is to produce wheels that will absorb jars without the use of pneumatic tires.

I attain these objects by having (1) a wheel structurally built in two main sections, the hub, and the rim section; (2) intercommunicating pneumatic cushions to support the two sections, and sliding guides pivotally connected in their center to guide the two sections in relation to each other; (3) a pivotal collar-ball within each of said guides; (4) and other means herebelow explained, with the help of accompanying drawings, in which similar characters denote similar parts throughout: Thus, Fig. 1 is a side view of a wheel constructed and arranged in accordance with the present invention.

Fig. 2 is a transverse section of Fig. 1, taken on line 2—2 of Figure 1.

Fig. 3 shows an enlarged cross section of the wheel, taken on line 3—3 of Figure 1.

Fig. 4 shows an enlarged view of the collar-ball, as shown in Figs. 3 and 5.

Fig. 5 is a cross section, taken on the line DD of Fig. 3.

Fig. 6 is a view of one of the rings of the hub section.

Fig. 7 shows a square collar that may be used, instead of the collar-ball shown in Fig. 4.

Fig. 8 shows one modified form of ring of the hub section.

In the hub section, 20 represents the hub, 5 the spokes thereof, which are reduced in size at their outer ends, 23, so that the collar-balls, 6, may be of reasonable size. The rim, 13, has in the case of a three-spoke wheel a triangular shape up to near the end of the spokes where it takes more the shape of a regular rim, 24. Said rim has projections, or ears, 35, extending from the inner side of the triangular rim so that the latter will be out of direct line with the spokes and thus may work free of the guiding members, 11 and 12. Into said ears and the outer ends of the spokes, screw-bolts, 17, are inserted to hold the rim to the spokes.

The rim section consists of the rim, 25, from which inwardly extend the spokes, 1, having a U-shape from their bases up, and their bases have side projections, 22, thru which bolts, 26, secure them to the rim. At the inner ends of the U-shaped spokes are attached the rings, 2, 2; a ring, 8, is attached to the bottom of each U-shaped spoke and at the bottom of the guide plate, 9, by screw-bolt, 27. The rings, 2, 2, have on their inner sides the plate-like brackets, 14. Said rings, 2, 2, 8, and the brackets, 14, are a part of the rigid spokes and could all or most of it be in one piece. The rings, 2, 2, are, in this case, about one inch wide with their outer ends curved inward. Into them and passing thru the rings, 8, 10, 10, are inserted the pneumatic cushions, 7. The curved ends of the rings, 2, 2, serve to keep said cushions from coming out, and the openings, 16, are made in said rings to engage corresponding enlargements or butts made in the pneumatic cushions to prevent the latter from turning around in their receptacles. The rings, 2, 2, are spaced from ring, 8, and into said spaces are placed movable rings, 10, 10, to which reference will be made later. A brace, 32, fastened by bolts, 28 and 29, is placed between each spoke and the rim for re-inforcement. The tubular ring, 3, connects all of the pneumatic cushions. These cushions are inflated by pumping air thru the valve, 31. The projection of the ring, 8, between the brackets, 14, is bent over to make room for the members, 11 and 12. Plates, 9, are fastened rigidly to the plate-like brackets, 14, by means of screw-bolts, 15 and 27.

To guide the spokes, 5, relative to the spokes, 1, the guiding members or rods made mainly of two parts, 11 and 12, are employed. Into each part is a socket into which the collar-ball, 6, pivotally fits, and the guiding members are held together by screw-bolts, 21. These members pass slidably through the borings in the plates, 9, and at their outer ends, 33, are rigidly connected to the rings, 10, by bolts, 34. Each of said members has a depression, 30, into which is placed the end of the rubber sleeve, 4, and the metal band, 18, fastened by bolt, 19.

The collar-ball, 6, is bored thru its center and placed slidably on the reduced part of the spoke, 5. It serves as a pivot for the guide rods, 11 and 12, and for the spokes, 5, in the swinging movement of the plane of the wheel. Instead of a collar-ball, a square block with pins on opposite sides, as shown in Fig. 7, may be used.

The ring, 10, is about one-fourth of an inch or more wide, by one-sixteenth of an inch, or more, thick, and has an inside form somewhat oval; instead of being equal the distance from $a$ to $a$, is less than from $e$ to $e$, so that when the compression is made against the pneumatic cushions, the sides, $e$ and $e$, will not rub against the resilients and wear out the same unnecessarily. The portions, $a$ and $a$, instead of being oval can be made square, as shown in Fig. 8.

By pumping the air into the cushion, 7, thru the air valve, 31, the divers parts of the receptacles, 2, 2, 10 8, and 10, come into unison and compel the hub and rim sections of the wheel to remain within their bounds while absorbing shocks and jars.

While in Figure 3 the parts 2, 8 and 10 are shown as having close sliding connection and in Figure 2, the same parts are shown as spaced, such showings are for the purpose of clearness.

It is understood that the construction of any parts of the wheel may be varied, provided the objects and purposes in view are attained.

Having thus described my invention, what I claim as new and desire to secure by Letters Patent, is:

1. A vehicle wheel comprising an outer rim section, and an inner hub section, each of said sections provided with stub spokes projecting toward each other, laterally spaced rings carried at the inner ends of the rim spokes, extensions projecting from said rings, perforated bridges connecting the free ends of said extensions, the hub section, the stub spokes projecting radially therefrom, an approximately triangular brace attached thereto, centrally bored balls having slidable connection with the hub section spokes, said balls rotatably mounted in guides whereby said guides are loosely connected with said spokes, said guides extending through the aforesaid perforated bridges, rings projecting from the ends of said guides said rings positioned laterally in alinement with and interposed between the rings at the inner ends of the outer rim section stub-spokes, inflatable cushions lying within the openings of said laterally alined rings said cushion serving to key the rim and hub sections together, and means to pneumatically connect said cushions.

2. A vehicle wheel consisting of an outer rim member, stub spokes projecting radially inwardly therefrom and having laterally spaced apart rings at their inner ends, inwardly projecting extensions angularly disposed with respect to said spokes, perforated bridges connecting the free end of such extensions, an inner hub member, stub spokes projecting radially therefrom but angularly disposed with respect to the radial direction of the rim member spokes, guide members passing slidably through the perforations of the aforesaid bridges and pivotally connected at their centers with the said hub member spokes, and inflatable cushions mounted within the aforesaid rings and the guide members, to couple the rim and hub members together.

3. A vehicle wheel consisting of an outer rim member, stub spokes projecting inwardly therefrom and toward the axis of the wheel, rings rigidly secured to the inner ends of said spokes said rings provided with rigid inwardly projecting extensions, rigid bars bridging and connecting said extensions, said bars provided with borings, a hub member, stub spokes projecting outwardly therefrom, a rigid brace rim connected to the outer ends of said hub spokes, guide members loosely connected to said hub spokes, a collar ball loosely connected to each of said guides, and slidably mounted on said hub spokes, said guide extending through the aforesaid borings of the rigid bridging plates, rings carried at both ends of said guide members in line with and between the rigid rings at the inner ends of the rim member spokes, and pneumatic cushions inserted and held within the alined rings of spokes and guides, whereby the rim member and the hub member are flexibly keyed together adjacent the inner end of the rim stub spokes.

In testimony whereof I have signed my name to this specification in the presence of two subscribing witnesses.

H. C. DAUPHINAIS.

Witnesses:
HAROLD P. THOMSON,
L. H. AMIDON.